(12) United States Patent
Nakata et al.

(10) Patent No.: US 7,682,436 B2
(45) Date of Patent: Mar. 23, 2010

(54) CARBON BLACK AQUEOUS DISPERSION AND METHOD OF PRODUCING THE SAME

(75) Inventors: Hidenao Nakata, Tokyo (JP); Toshiya Horii, Tokyo (JP)

(73) Assignee: Tokai Carbon Co., Ltd., Minato-ku (JP)

( * ) Notice: Subject to any disclaimer, the term of this patent is extended or adjusted under 35 U.S.C. 154(b) by 159 days.

(21) Appl. No.: 12/083,651

(22) PCT Filed: Oct. 11, 2006

(86) PCT No.: PCT/JP2006/320687

§ 371 (c)(1),
(2), (4) Date: Apr. 15, 2008

(87) PCT Pub. No.: WO2007/055084

PCT Pub. Date: May 18, 2007

(65) Prior Publication Data

US 2009/0173252 A1    Jul. 9, 2009

(30) Foreign Application Priority Data

Oct. 25, 2005   (JP) .............................. 2005-309749

(51) Int. Cl.
C09D 11/00   (2006.01)
(52) U.S. Cl. ...................... 106/31.9; 106/400
(58) Field of Classification Search ................ 106/31.9, 106/400
See application file for complete search history.

(56) References Cited

U.S. PATENT DOCUMENTS

| | | | | |
|---|---|---|---|---|
| 6,398,858 | B1 * | 6/2002 | Yu et al. ................... | 106/31.64 |
| 6,399,202 | B1 * | 6/2002 | Yu et al. ..................... | 428/403 |
| 2002/0020318 | A1 * | 2/2002 | Galloway et al. ........ | 101/401.1 |
| 2002/0036677 | A1 * | 3/2002 | Watanabe et al. ............. | 347/65 |
| 2005/0277040 | A1 * | 12/2005 | Michel et al. ............ | 430/108.2 |
| 2009/0064900 | A1 * | 3/2009 | Nakata et al. ............... | 106/472 |

* cited by examiner

*Primary Examiner*—Jerry Lorengo
*Assistant Examiner*—Veronica Faison Gee
(74) *Attorney, Agent, or Firm*—Flynn, Thiel, Boutell & Tanis, P.C.

(57) ABSTRACT

A carbon black aqueous dispersion which exhibits excellent dispersibility in an aqueous medium, a small amount of feathering, excellent rubbing resistance (quick-drying properties), excellent discharge stability, and the like, and is suitable as an ink for inkjet printers and the like, and a method of producing the same are disclosed. The carbon black aqueous dispersion includes an aqueous medium and carbon black dispersed in the aqueous medium, acidic hydrogen-containing groups on the surface of the carbon black being neutralized with divalent or higher valent cations and monovalent cations so that 50 to 95% of hydrogen atoms of the acidic hydrogen-containing groups are replaced by the divalent cations and the remaining hydrogen atoms are replaced by the monovalent cations, and the method includes subjecting carbon black to liquid-phase oxidation in an oxidizing agent aqueous solution, removing reduced salts from the resulting slurry, adding divalent or higher valent cations and monovalent cations to the slurry to replace 50 to 95% of hydrogen atoms of acidic groups by the divalent cations and replace the remaining hydrogen atoms by the monovalent cations, and purifying the resulting product.

3 Claims, No Drawings

CARBON BLACK AQUEOUS DISPERSION AND METHOD OF PRODUCING THE SAME

TECHNICAL FIELD

The present invention relates to a carbon black aqueous dispersion suitable as an aqueous black ink used for inkjet printers and the like, and a method of producing the same.

BACKGROUND ART

Since carbon black has hydrophobicity and low wettability with water, it is extremely difficult to stably disperse carbon black in an aqueous medium at a high concentration. This is because the surface of carbon black has only a small number of functional groups (e.g., hydrophilic hydrogen-containing functional groups such as a carboxyl group and a hydroxyl group) having high affinity with water molecules. Various attempts have been made to improve the water-dispersibility of carbon black by oxidizing the carbon black to produce hydrophilic functional groups on the surface of the carbon black.

For example, JP-A-48-018186 discloses a method which oxidizes carbon black with a hypohalite aqueous solution, and JP-A-57-159856 discloses a method which oxidizes carbon black by a low-temperature oxygen plasma.

A method of producing an aqueous ink has also been proposed in which the water-dispersibility of moderately oxidized carbon black is improved using a coupling agent, a surfactant, or the like (e.g., JP-A-4-189877). However, it is difficult to stably maintain the dispersibility of carbon black over a long period of time because the surfactant or the like is oxidized or decomposed due to a change in temperature or a change with time.

As a method of surface-treating carbon black while improving dispersibility, a method has been proposed which finely atomizes carbon black in water utilizing glass beads and oxidizes the carbon black with a hypohalite. However, the atomization effect is diminished due to buoyancy applied to the glass beads in water. Moreover, since active sites are rarely formed, it is difficult to uniformly produce functional groups on the surface of the carbon black.

JP-A-08-003498 discloses an aqueous pigment ink containing water and carbon black having a surface active hydrogen content of 1.5 mmol/g or more, and a method of producing an aqueous pigment ink containing water and carbon black which includes (a) providing acidic carbon black and (b) further oxidizing the acidic carbon black in water using a hypohalite. JP-A-08-319444 discloses a method of producing an aqueous pigment ink which includes finely dispersing carbon black having an oil absorption of 100 ml/100 g or less in an aqueous medium and then oxidizing the carbon black using a hypohalite.

The above method aims at obtaining an aqueous pigment ink which exhibits excellent water-dispersibility and excellent long-term dispersion stability by oxidizing carbon black so that the surface of the carbon black has a number of active hydrogens (i.e., hydrophilic functional groups). On the other hand, since the number of hydrophilic functional groups present at the contact interface between the surface of carbon black particles and water molecules is important for dispersing carbon black in water and maintaining a stable dispersed state, it is difficult to accurately determine the dispersibility of carbon black merely based on the number of functional groups per unit weight of carbon black.

JP-A-11-148027 discloses water-dispersible carbon black which is modified by oxidation, wherein the total number of carboxyl groups and hydroxyl groups among hydrogen-containing functional groups present on the surface of the carbon black is 3 μeq/m$^2$ or more per unit surface area. JP-A-09-286938 discloses an aqueous pigment ink in which carbon black is oxidized with a hypohalous acid and/or a hypohalite, and at least some acidic groups present on the surface of the oxidized carbon black are bonded to an amine compound to form an ammonium salt. Ammonia, a volatile amine replaced by an alkyl group having 1 to 3 carbon atoms, an amine compound replaced by an alkanol group (i.e., alkanolamine or alkylalkanolamine), or the like is used as the amine compound. Since the compounds other than ammonia have a low degree of dissociation, a substitution reaction with hydrogen in the acidic group occurs to only a small extent.

DISCLOSURE OF THE INVENTION

The present invention has been conceived to solve the above-described problems of the related art. An object of the present invention is to provide a carbon black aqueous dispersion which exhibits excellent dispersibility in an aqueous medium, a high degree of blackness, a small amount of feathering, excellent storage stability, excellent rubbing resistance (quick-drying properties), and excellent discharge stability, and is suitable as an aqueous black ink used for inkjet printers and the like, and a method of producing the same.

A carbon black aqueous dispersion according to the present invention which achieves the above object comprises an aqueous medium and carbon black dispersed in the aqueous medium, acidic hydrogen-containing groups on the surface of the carbon black being neutralized with divalent or higher valent cations and monovalent cations so that 50 to 95% of hydrogen atoms of the acidic hydrogen-containing groups are replaced by the divalent cations and the remaining hydrogen atoms are replaced by the monovalent cations.

A method of producing a carbon black aqueous dispersion according to the present invention comprises subjecting carbon black to liquid-phase oxidation in an oxidizing agent aqueous solution, removing reduced salts from the resulting slurry, adding divalent or higher valent cations and monovalent cations to the slurry to replace 50 to 95% of hydrogen atoms of acidic groups by the divalent cations and replace the remaining hydrogen atoms by the monovalent cations, and purifying the resulting product.

The carbon black used in the present invention is not particularly limited. For example, furnace black, channel black, acetylene black, thermal black, or the like may be used. The aqueous medium may contain a water-soluble organic solvent in addition to water. It is preferable to use water (particularly deionized water) from the viewpoint of cost and safety.

In the carbon black aqueous dispersion according to the present invention, acidic hydrogen-containing groups among functional groups present on the surface of the carbon black are neutralized with (replaced by) divalent or higher valent cations and monovalent cations.

Functional groups present on the surface of carbon black particles differ depending on the production history. For example, the number of functional groups of channel black is larger than that of furnace black. Therefore, when the number of functional groups is small, it is necessary to produce functional groups on the surface of carbon black particles in advance by oxidation.

Acidic hydrogen-containing groups are important as the functional groups on the surface of carbon black particles. In particular, carboxyl groups and hydroxyl groups play an important role. Therefore, the number of carboxyl groups and hydroxyl groups among the acidic hydrogen-containing groups is substantially important. Accordingly, when the number of acidic hydrogen-containing groups is small, it is necessary to oxidize the carbon black in advance.

The number of acidic hydrogen-containing groups is measured by the following methods.

(1) Measurement of Number of Carboxyl Groups (Carboxyl Group Content)

About 2 to 5 g of oxidized carbon black is added to a 0.976 N sodium hydrogen carbonate aqueous solution. The mixture is shaken for about six hours and then filtered. The number of carboxyl groups is then measured by titration.

(2) Measurement of Number of Hydroxyl Groups (Hydroxyl Group Content)

2,2'-Diphenyl-1-picrylhydrazyl (DPPH) is dissolved in carbon tetrachloride to prepare a $5 \times 10^{-4}$ mol/l solution. 0.1 to 0.6 g of oxidized carbon black is added to the solution. The mixture is stirred in a thermostat bath at 60° C. for six hours, and then filtered. The filtrate is measured using an ultraviolet absorptiometer, and the number of hydroxyl groups is calculated from the absorbance.

Acidic hydrogen-containing groups such as carboxyl groups and/or hydroxyl groups on the surface of the carbon black particles are neutralized with divalent or higher valent cations and monovalent cations so that the hydrogen atoms are replaced by these cations.

Examples of the divalent or higher valent cations include beryllium, magnesium, calcium, strontium, barium, radium, scandium, titanium, vanadium, chromium, manganese, iron, cobalt, nickel, copper, zinc, gold, cadmium, mercury, lead, platinum, boron, aluminum, gallium, and the like. These cations are used as a hydroxide, for example. These cations may also be used as a salt such as a sulfate, a carbonate, a nitrate, a hydrochloride, a phosphate, or a borate.

Examples of the monovalent cation include sodium, lithium, potassium, rubidium, cesium, ammonium, and the like. These monovalent cations are preferably used as a hydroxide. A tetraalkylammonium hydroxide may also be used.

The following chemical formula 1 shows a case where a carboxyl group and a hydroxyl group (i.e., acidic hydrogen-containing groups) on the surface of a carbon black particle are neutralized with and replaced by a divalent or higher valent cation, and the following chemical formula 2 shows a case where a carboxyl group and a hydroxyl group (i.e., acidic hydrogen-containing groups) on the surface of a carbon black particle are neutralized with and replaced by monovalent cations.

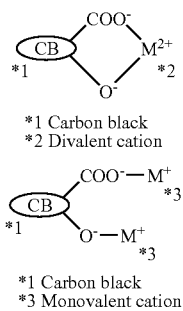

*1 Carbon black
*2 Divalent cation

*1 Carbon black
*3 Monovalent cation

The following chemical formula 3 shows a case where some acidic hydrogen-containing groups are neutralized with and replaced by a divalent or higher valent cation, and the remaining acidic hydrogen-containing groups are neutralized with and replaced by monovalent cations.

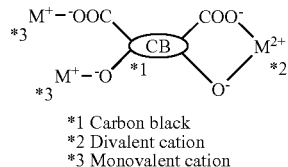

*1 Carbon black
*2 Divalent cation
*3 Monovalent cation

In this case, 50 to 95% of the acidic hydrogen-containing groups are replaced by the divalent cations, and the remaining acidic hydrogen-containing groups are replaced by the monovalent cations. If the amount of acidic hydrogen-containing groups replaced by the divalent cations is less than 50%, feathering properties and rubbing resistance decrease.

The carbon black aqueous dispersion according to the present invention is characterized in that the carbon black of which the acidic hydrogen-containing groups are neutralized with and replaced by cations is dispersed in the aqueous medium. As a result, the carbon black aqueous dispersion according to the present invention exhibits excellent water-dispersibility, a high degree of blackness (i.e., the carbon black aggregates immediately after the ink has been printed on paper), excellent feathering properties, excellent rubbing resistance (quick-drying properties), excellent discharge performance, and the like, and is suitably used as an aqueous black ink for inkjet printers and the like.

The carbon black aqueous dispersion according to the present invention may be produced by subjecting carbon black to liquid-phase oxidation in an oxidizing agent aqueous solution, removing reduced salts from the resulting slurry, adding divalent or higher valent cations and monovalent cations to the slurry to replace 50 to 95% of hydrogen atoms of acidic groups by the divalent cations and replace the remaining hydrogen atoms by the monovalent cations, and purifying the resulting product.

Since the surface of carbon black such as furnace black normally has a small number of acidic functional groups, the carbon black is subjected to liquid phase oxidization by adding the carbon black to the oxidizing agent aqueous solution and stirring the mixture to produce carboxyl groups and hydroxyl groups on the surface of the carbon black.

As the oxidizing agent aqueous solution used for liquid-phase oxidation, an aqueous solution of an oxidizing agent such as nitric acid, sulfuric acid, chlorate, persulfate, perborate, percarbonate, or the like is used. The degree of liquid-phase oxidation is adjusted by changing the oxidizing agent concentration of the oxidizing agent aqueous solution, the amount of carbon black added to the oxidizing agent aqueous solution, the oxidation temperature, the oxidation time, the stirring speed, and the like.

For example, an appropriate amount of carbon black is added to the oxidizing agent aqueous solution of which the concentration has been adjusted. The mixture is then stirred at approximately room temperature to 90° C., and preferably 60 to 90° C. to prepare a slurry. The carbon black is oxidized in the slurry.

Hydrophilic acidic hydrogen-containing groups such as carboxyl groups and hydroxyl groups are produced on the surface of the carbon black due to oxidation. In this case, the carbon black can be efficiently dispersed in the oxidizing agent aqueous solution by subjecting the carbon black to wet or dry oxidation in advance, whereby the carbon black can be uniformly and efficiently subjected to liquid-phase oxidation. Wet oxidation is performed using ozone water, a hydrogen peroxide aqueous solution, persulfuric acid, or a persulfate. Dry oxidation is performed by exposing the carbon black to a gas atmosphere such as ozone, oxygen, $NO_X$, or $SO_X$.

A surfactant is preferably added to the oxidizing agent aqueous solution so that the carbon black is uniformly dispersed in the oxidizing agent aqueous solution. As the surfactant, an anionic surfactant, a nonionic surfactant, or a cationic surfactant may be used.

The acidic hydrogen-containing groups such as carboxyl groups and hydroxyl groups produced on the surface of the carbon black due to liquid-phase oxidation are then neutralized. A neutralization reaction proceeds smoothly and efficiently by removing reduced salts produced in the slurry due to liquid-phase oxidation before neutralization. Reduced salts may be removed using a separation membrane such as an ultrafilter (UF) membrane, a reverse osmosis (RO) membrane, or an electrodialysis membrane.

The carbon black in the slurry from which reduced salts have been removed is neutralized by adding divalent or higher valent cations and monovalent cations. In this case, the amounts of divalent or higher valent cations and monovalent cations to be added are adjusted so that 50 to 95% of the acidic hydrogen-containing groups are replaced by the divalent or higher valent cations and the remaining acidic hydrogen-containing groups are replaced by the monovalent cations. It is preferable to neutralize the carbon black while stirring the slurry at room temperature to 100° C. for 3 to 20 hours in a state in which the pH of the slurry is adjusted to 4.0 to 12.0 so that a neutralization reaction proceeds smoothly, for example.

Salts which have been produced by neutralization and hinder the water-dispersibility of the carbon black are removed by purification. Removal of salts is also effective for preventing the carbon black from re-aggregating in the slurry. Reduced salts are removed by purification using a separation membrane such as an ultrafilter (UF) membrane, a reverse osmosis (RO) membrane, or an electrodialysis membrane. The slurry is purified until the conductivity of the slurry decreases to 5 mS/cm or less when the carbon black content is 20 wt %, for example.

Large undispersed clusters and coarse particles may be contained in the carbon black aqueous dispersion and may cause clogging of a nozzle when using the carbon black aqueous dispersion as an inkjet printer ink, for example. Therefore, large undispersed clusters and coarse particles are preferably classified and removed by centrifugation, filtration, or the like.

It is preferable to atomize the carbon black agglomerates in the carbon black aqueous dispersion which has been purified and optionally classified. The carbon black agglomerates are atomized by spraying the carbon black aqueous dispersion at high speed from a nozzle under pressure so that collision occurs between the sprayed streams or between the sprayed streams and a wall surface. The carbon black agglomerates in the carbon black aqueous dispersion are atomized by collision, a shear force during spraying, and the like.

Various commercially-available atomizers may be used as an atomizing means. Examples of such atomizers include Microfluidizer (manufactured by Microfluidics Corporation), Ultimizer (manufactured by Sugino Machine Limited), Nanomizer (manufactured by Tokai Corporation), a high-pressure homogenizer, and the like. The carbon black agglomerates are preferably atomized so that the maximum particle diameter of the agglomerates becomes 1 μm or less by spraying the slurry from a spray nozzle under a pressure of 50 to 250 MPa, for example.

The coarse particle classification process and the agglomerate atomization process may be performed after neutralization (i.e., the acidic hydrogen-containing groups on the surface of the carbon black particles have been neutralized with and replaced by divalent or higher valent cations and monovalent cations), but before purification.

A carbon black aqueous dispersion in which the carbon black is finely dispersed in the aqueous medium is thus produced. The carbon black aqueous dispersion may be further purified and concentrated depending on the application to produce an aqueous black ink used for inkjet printers and the like.

Specifically, an aqueous black ink is prepared by adding or removing the aqueous medium to adjust the carbon black concentration to an appropriate concentration (e.g., 0.1 to 20 wt %), and optionally adding commonly-used ink additives such as an antiseptic agent, a viscosity regulator, and a resin.

EXAMPLES

The present invention is described below by way of examples and comparative examples. Note that the following examples illustrate only one specific mode of the present invention. The present invention is not limited to the following examples.

Examples 1 to 3 and Comparative Examples 1 to 3

150 g of carbon black ("Seast 9" manufactured by Tokai Carbon Co., Ltd.) was added to 3000 ml of a 2.0 N ammonium persulfate aqueous solution. The mixture was then subjected to liquid-phase oxidation at 60° C. for 10 hours with stirring (300 rpm). After removing reduced salts from the slurry using an ultrafilter membrane ("AHP-1010" manufactured using Asahi Kasei Corporation; molecular weight cutoff: 50,000), the oxidized carbon black was filtered off. The carboxyl group content and the hydroxyl group content of the oxidized carbon black were 400 μmol/g and 200 μmol/g, respectively.

The oxidized carbon black was neutralized by adding magnesium hydroxide and sodium hydroxide to the slurry in different concentration ratios. After neutralization, the remaining salts were separated from the carbon black slurry by purification using an ultrafilter membrane ("AHP-1010" manufactured by Asahi Kasei Corporation; molecular weight cutoff: 50,000). The resulting product was concentrated to produce a carbon black aqueous dispersion (carbon black concentration: 20 wt %). The conductivity of the aqueous dispersion was 0.6 mS/cm.

A carbon black aqueous dispersion was thus produced in which carbon black, of which the hydrogen atoms of the acidic hydrogen-containing groups were replaced by magnesium and sodium in different ratios, was dispersed.

The dispersibility of the carbon black aqueous dispersion (carbon black concentration: 20 wt %) was evaluated by the following methods.

Viscosity: A sample was placed in an airtight container and kept at 70° C. The viscosity of the sample was measured after 1 to 4 weeks using a rotational vibration type viscometer ("VM-100-L" manufactured by Yamaichi Electronics Co., Ltd.). The dispersion stability of the carbon black during heating was evaluated based on the change in viscosity.

Particle diameter of carbon black agglomerate: The carbon black concentration of each sample of which the viscosity was measured was adjusted to 0.1 to 0.5 kg/cm$^3$. The particle diameters of the carbon black agglomerates were measured using a heterodyne laser Doppler particle size distribution measurement device ("UPA model 9340" manufactured by Microtrac Inc.), and a cumulative frequency distribution curve was drawn. A value corresponding to a cumulative percentage of 99% was determined to be the maximum particle diameter (Dupa 99%) of the carbon black agglomerates, and a value corresponding to a cumulative percentage of 50% was determined to be the average particle diameter (Dupa 50%) of the carbon black agglomerates. A change in the particle diameters of the carbon black agglomerates with time was thus determined.

Print density (OD value): An ink was prepared according to the formulation shown in Table 2. The ink was filtered through a membrane filter having a pore size of 0.8 μm. An ink cartridge for an inkjet printer ("IP3100" manufactured by Canon Inc.) was charged with the ink. Alphanumeric characters were then printed on multipurpose paper (Xerox 4024). When one hour or more elapsed after printing, the optical density was measured using a Macbeth densitometer ("RD-927" manufactured by Kollmorgen Instruments Corporation) and taken as the print density.

The results are shown in Table 1.

elapsed after printing, the clarity of the characters and feathering occurring from the characters were observed using a microscope and with the naked eye to evaluate the effects of the ink on the image according to the following standard.

Excellent: Clear printing with almost no feathering

Good: Clear printing with no significant feathering

TABLE 1

|  | Example | | | Comparative Example | | |
|---|---|---|---|---|---|---|
|  | 1 | 2 | 3 | 1 | 2 | 3 |
| Substitution ratio of acidic hydrogen-containing groups | | | | | | |
| Magnesium (%) | 90 | 70 | 50 | 0 | 30 | 100 |
| Sodium (%)*[1] | 10 | 30 | 50 | 100 | 70 | 0 |
| Viscosity (cp) | | | | | | |
| Initial | 6.57 | 6.24 | 5.98 | 6.41 | 6.31 | 6.47 |
| After 1 week at 70° C. | 5.64 | 6.21 | 5.95 | 5.45 | 6.28 | 7.86 |
| After 2 weeks at 70° C. | 5.57 | 6.18 | 5.91 | 5.23 | 6.24 | 10.49 |
| After 3 weeks at 70° C. | 5.58 | 6.12 | 5.92 | 5.21 | 6.23 | Gelled |
| After 4 weeks at 70° C. | 5.57 | 6.14 | 5.89 | 5.36 | 6.21 | Gelled |
| Average particle diameter Dupa50% (nm) | | | | | | |
| Initial | 147 | 141 | 138 | 145 | 142 | 141 |
| After 1 week at 70° C. | 145 | 139 | 135 | 139 | 141 | 159 |
| After 2 weeks at 70° C. | 144 | 138 | 131 | 141 | 139 | 172 |
| After 3 weeks at 70° C. | 142 | 134 | 134 | 138 | 138 | Gelled |
| After 4 weeks at 70° C. | 147 | 134 | 134 | 143 | 137 | Gelled |
| Maximum particle diameter Dupa99% (nm) | | | | | | |
| Initial | 338 | 324 | 315 | 324 | 321 | 325 |
| After 1 week at 70° C. | 327 | 321 | 312 | 313 | 319 | 362 |
| After 2 weeks at 70° C. | 324 | 318 | 311 | 312 | 319 | 412 |
| After 3 weeks at 70° C. | 325 | 322 | 308 | 326 | 317 | Gelled |
| After 4 weeks at 70° C. | 321 | 32 | 309 | 315 | 315 | Gelled |
| Print density (OD value) | 1.54 | 1.51 | 1.49 | 1.42 | 1.44 | 1.56 |

*[1]Percentage of acidic hydrogen-containing groups replaced by magnesium ions or sodium ions The carbon black concentration of the carbon black aqueous dispersion was adjusted to 10 wt %, and ink additives were added to the carbon black aqueous dispersion in a ratio shown in Table 2 to prepare an inkjet printing aqueous ink.

TABLE 2

| Carbon black aqueous dispersion | 40.0 wt % |
|---|---|
| Water-soluble organic solvent (glycerol) | 6.0 wt % |
| Surfactant (Acetylenol EH) | 0.2 wt % |
| Diethylene glycol | 6.0 wt % |
| Trimethylolpropane | 6.0 wt % |
| Ultrapure water | 41.8 wt % |

The feathering properties, the rubbing resistance (quick-drying properties), the discharge properties, and the metal corrosion properties of the aqueous ink were evaluated by the following methods. The results are shown in Table 3.

Feathering properties: An ink cartridge for an inkjet printer ("IP3100" manufactured by Canon Inc.) was charged with the aqueous ink. Alphanumeric characters were printed on multipurpose paper (Xerox 4024). When one hour or more Poor: Unclear printing with rather significant feathering Very poor: Unclear printing with significant feathering Rubbing resistance (quick-drying properties): An ink cartridge for an inkjet printer ("IP3100" manufactured by Canon Inc.) was charged with the aqueous ink. Alphanumeric characters were printed on multipurpose paper (Xerox 4024). When a specific period of time had elapsed after printing, unprinted paper of the same type was placed on the printed paper. After placing a flat and smooth weight (100 g) on the paper, the printed paper was quickly pulled out. The period of time required for the characters to be fixed on the printed paper was measured, and evaluated according to the following standard.

Good: 15 seconds or less

Poor: 16 seconds or more

Discharge properties: An ink cartridge for an inkjet printer ("S600" manufactured by Canon Inc.) was charged with the aqueous ink. Alphanumeric characters were printed on multipurpose paper (Xerox 4024). Discharge stability and discharge response were then checked. Discharge stability was checked by discharging the carbon black aqueous dispersion for 24 hours at temperatures of 5° C., 20° C., and 40° C. The discharge response was checked by performing one-minute intermittent discharges 100 times and checking whether or not the ink could be discharged after two months. A case where the ink could be normally discharged during discharge stability checking and discharge response checking and did not cause the inkjet head to be clogged was evaluated as "Good." Otherwise, the ink was evaluated as "Poor".

Metal corrosiveness: A piece of an iron-nickel alloy used as a raw material for a metal member provided in an ink supply path was immersed in the ink at 60° C. for two hours. The surface of the alloy piece was observed with the naked eye before and after immersion to evaluate the degree of corrosion.

Good: The surface of the alloy piece was not corroded, or only slight discoloration was observed.

Poor: The surface of the alloy piece was corroded.

TABLE 3

|  | Example | | | Comparative Example | | |
| --- | --- | --- | --- | --- | --- | --- |
|  | 1 | 2 | 3 | 1 | 2 | 3 |
| Feathering | Excellent | Excellent | Excellent | Very poor | Good | Excellent |
| Rubbing resistance (quick-drying properties) | Good | Good | Good | Poor | Poor | Good |
| Discharge properties | Good | Good | Good | Good | Good | Very poor |
| Metal corrosiveness | Good | Good | Good | Good | Good | Good |

As shown in Tables 1 to 3, the carbon black aqueous dispersions according to the examples exhibited stable dispersibility as compared with the carbon black aqueous dispersions according to the comparative examples. The inks prepared using the aqueous dispersions according to the examples exhibited excellent feathering properties, friction resistance, and discharge performance. Therefore, it was confirmed that these inks are suitable as an aqueous black ink for an inkjet printer or the like.

INDUSTRIAL APPLICABILITY

According to the present invention, a carbon black aqueous dispersion comprising an aqueous medium and carbon black dispersed in the aqueous medium, acidic hydrogen-containing groups on the surface of the carbon black being neutralized with divalent or higher valent cations and monovalent cations so that 50 to 95% of hydrogen atoms of the acidic hydrogen-containing groups are replaced by the divalent cations and the remaining hydrogen atoms are replaced by the monovalent cations, and a method of producing the same are provided. The carbon black aqueous dispersion exhibits excellent dispersibility, a high degree of blackness, a small amount of feathering, excellent storage stability, excellent rubbing resistance (quick-drying properties), and excellent discharge stability, and is suitable as an aqueous black ink used for inkjet printers and the like.

The invention claimed is:

1. A carbon black aqueous dispersion comprising an aqueous medium and carbon black dispersed in the aqueous medium, acidic hydrogen-containing groups on the surface of the carbon black being neutralized with divalent or higher valent cations and monovalent cations so that 50 to 95% of hydrogen atoms of the acidic hydrogen-containing groups are replaced by the divalent cations and the remaining hydrogen atoms are replaced by the monovalent cations.

2. The carbon black aqueous dispersion according to claim 1, wherein the acidic hydrogen-containing groups on the surface of the carbon black are carboxyl groups and/or hydroxyl groups.

3. A method of producing a carbon black aqueous dispersion, the method comprising subjecting carbon black to liquid-phase oxidation in an oxidizing agent aqueous solution, removing reduced salts from the resulting slurry, adding divalent or higher valent cations and monovalent cations to the slurry to replace 50 to 95% of hydrogen atoms of acidic groups by the divalent cations and replace the remaining hydrogen atoms by the monovalent cations, and purifying the resulting product.

* * * * *